United States Patent [19]

Rossato

[11] Patent Number: 5,207,001
[45] Date of Patent: May 4, 1993

[54] DEVICE FOR SUPPORTING MOTOR VEHICLE WHEELS WHEN TAKING SUSPENSION GEOMETRY MEASUREMENTS

[76] Inventor: Eride Rossato, Via Galileo Galilei, Mirano, Italy

[21] Appl. No.: 688,618
[22] PCT Filed: Dec. 11, 1989
[86] PCT No.: PCT/EP89/01511
§ 371 Date: Jun. 14, 1991
§ 102(e) Date: Jun. 14, 1991
[87] PCT Pub. No.: WO90/07095
PCT Pub. Date: Jun. 28, 1990

[30] Foreign Application Priority Data

Dec. 14, 1988 [IT] Italy ............................ 84145 A/88
Dec. 14, 1988 [IT] Italy ............................ 84147 A/88

[51] Int. Cl.[5] ............................................. G01B 5/25
[52] U.S. Cl. ............................ 33/203.12; 33/203.13
[58] Field of Search ............ 33/203.12, 203.13, 203.14, 33/203, 203.15, 203.2, 203.21

[56] References Cited

U.S. PATENT DOCUMENTS

| 3,411,346 | 11/1968 | Gagliardi | 33/203.13 |
| 3,812,592 | 5/1974 | Haupt | 33/203.13 |
| 4,055,899 | 11/1977 | Dean | 33/203.13 |
| 5,111,585 | 5/1992 | Kawashima et al. | 33/203.12 |

Primary Examiner—William A. Cuchlinski, Jr.
Assistant Examiner—William C. Dowling
Attorney, Agent, or Firm—Hoffman, Wasson & Gitler

[57] ABSTRACT

Device for supporting motor vehicle wheels when taking suspension geometry measurements, characterised by comprising: a structure (1,1',35) provided with ball supports (7) for its free resting on an underlying surface (15), at least a pair of rollers with substantially parallel axes, rotationally supported by said structure and supporting a wheel (16) of the vehicle (14), and means (21,21',33,33',41,49) to neutralize on command, the effect of said ball support (7) and to firmly bind said structure (1,1',35) to said underlying surface (15).

23 Claims, 4 Drawing Sheets

DEVICE FOR SUPPORTING MOTOR VEHICLE WHEELS WHEN TAKING SUSPENSION GEOMETRY MEASUREMENTS

This invention relates to a device for supporting motor vehicle wheels when taking suspension geometry measurements.

Suspension geometry measurements (convergence angle, camber angle etc.) require the vehicle to be positioned with its wheels on plates which are free to lie in the horizontal plane to conform with the stresses to which the vehicle is subjected. Suitable apparatus applied to the wheels enables the various measurements to be taken and the various quantities of interest to be calculated.

These plates are generally of different shapes according to whether they are to support the vehicle front or rear wheels, and in particular are circular for the front wheels (cf. EP-A2-0 215 540) and of elongated shape for the rear wheels (cf. EP-B1-0 051 088) to ensure correct positioning of said rear wheels when the front wheels are positioned on the circular discs, independently of the vehicle length, at least within certain limits.

These plates can be incorporated into the respective lift runways in the sense of being housed in corresponding seats provided in the runways, and have their surface coplanar with the runway plane. Alternatively they can be housed in structures applied to the runways and in this case they are housed in suitable seats provided therein such that the bearing surface for the wheels is coplanar with the runway plane.

In either case the known constructions have a plurality of drawbacks and limitations, and in particular:
the position of the vehicle on the runways is obligatory, involving a certain laboriousness in manoeuvering;
the front and rear plates are of different shape, requiring separate production;
both the incorporation of plates into the runways and the incorporation of plates into structures fitted to the runways has proved considerably complicated and costly;
although the rotation of the front plates (discs) is practically free of limitation, the rotation of the rear plates is less the greater their length, and this can be an unacceptable constraint especially in the case of vehicles with steered rear wheels;
the need to carry out certain measurements with the wheels lying in two positions 180° apart makes it necessary to raise the vehicle to effect this rotation, and because of the lateral inclination of the wheel plane (camber angle) this raising movement results in excessive lateral displacement of the plates, with frequent alteration in the values of the measurements taken; the measurements to be taken require perfect vehicle planarity and correct load distribution over the wheels, and for this reason they are influenced by non-uniform wheel inflation.

An object of the invention is to eliminate all these drawbacks and to provide a device for supporting motor vehicle wheels when taking suspension geometry measurements which is of simple construction and practical use.

A further object of the invention is to provide a device of the stated type which can be used both for vehicle front wheels and rear wheels.

A further object of the invention is to provide a device which does not require the vehicle to be raised between one measurement and the next to allow the wheels to be rotated through 180°.

A further object of the invention is to provide a device which can be adapted to vehicle lifts of any type, even to those not specifically designed for suspension geometry measurements.

All these and further objects which will be apparent from the description given hereinafter are attained according to the invention by a device for supporting motor vehicle wheels when taking suspension geometry measurements, comprising a structure provided with ball shaped supports for its free resting on an underlying horizontal surface, characterised by further comprising:
a pair of rollers with parallel axes, rotationally supported by said structure and supporting a wheel mounted on the vehicle,
means causing rotation of one of the two rollers,
means acting on said rest surface to neutralize, on command, the effect of said ball shaped supports and to firmly bind said structure to said surface when the rotation of said one roller is caused,
the two rollers of each pair being associated with members for being spaced apart to each other in a direction transverse to their axis between two end positions, in one of which the two rollers are on opposite sides of the zone of contact between said wheel and said resting surface, and in the other of which the two rollers are closer together to support said wheel raised from said resting surface.

The present invention is described in detail hereinafter with reference to the accompanying drawings in which.

Figure 1:
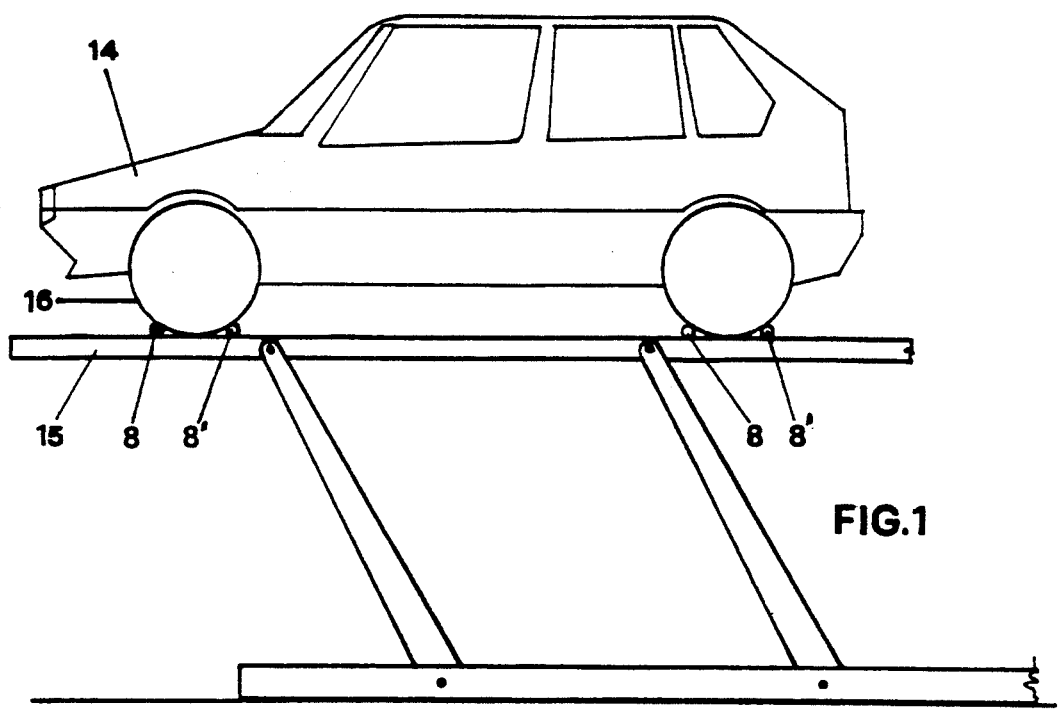
FIG. 1 is a diagrammatic overall side view of a vehicle lift carrying a device according to the invention applied to each wheel.
Figure 2:
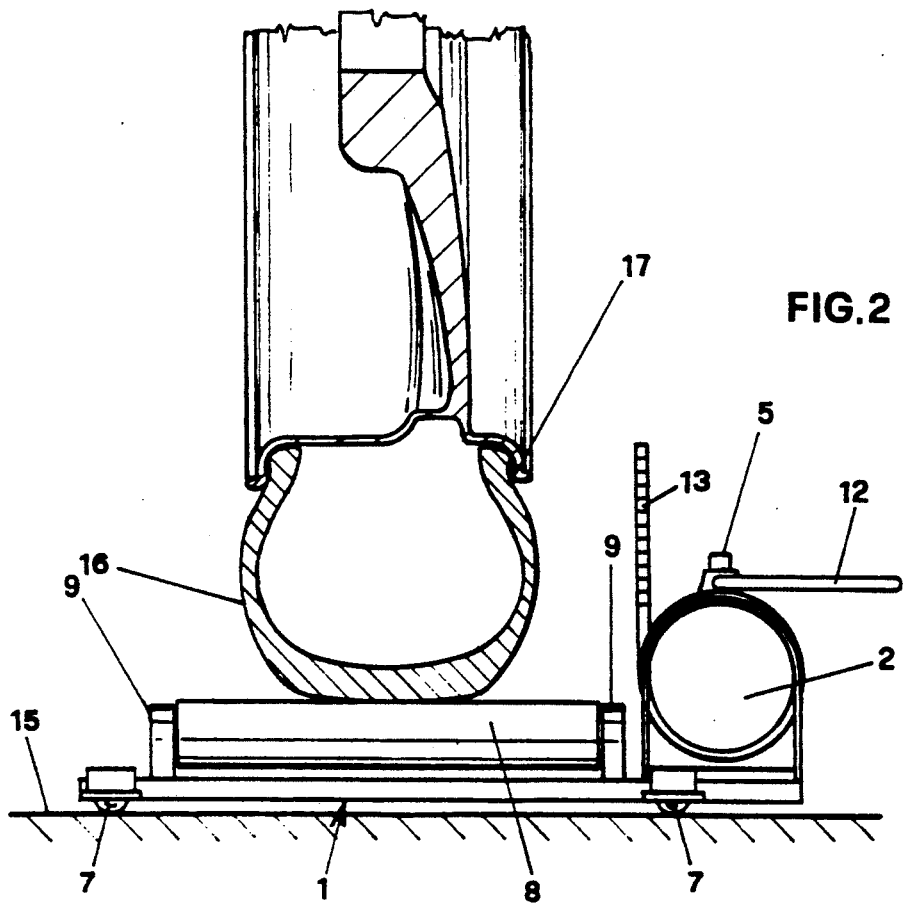
FIG. 2 is a side view of a device according to the invention on the line II—II of FIG. 3.
Figure 3:
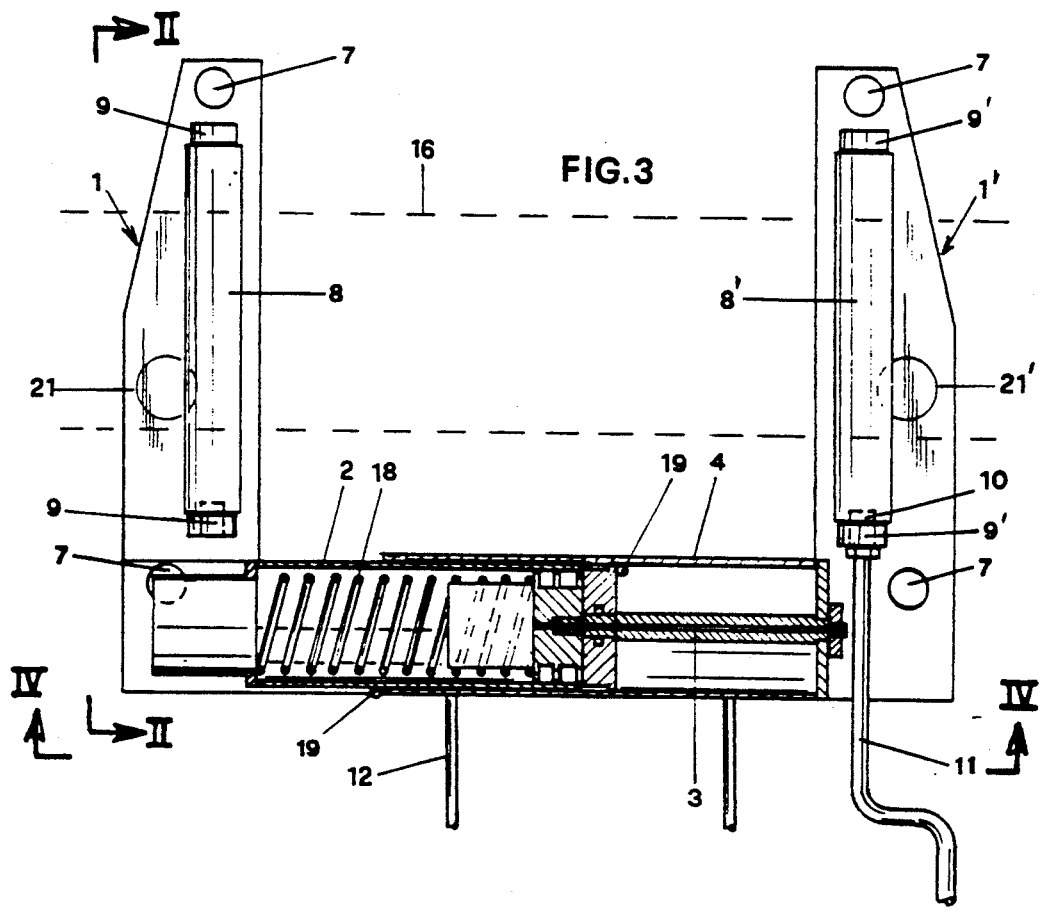
FIG. 3 is a plan view thereof on the line III—III of FIG. 4.
Figure 4:
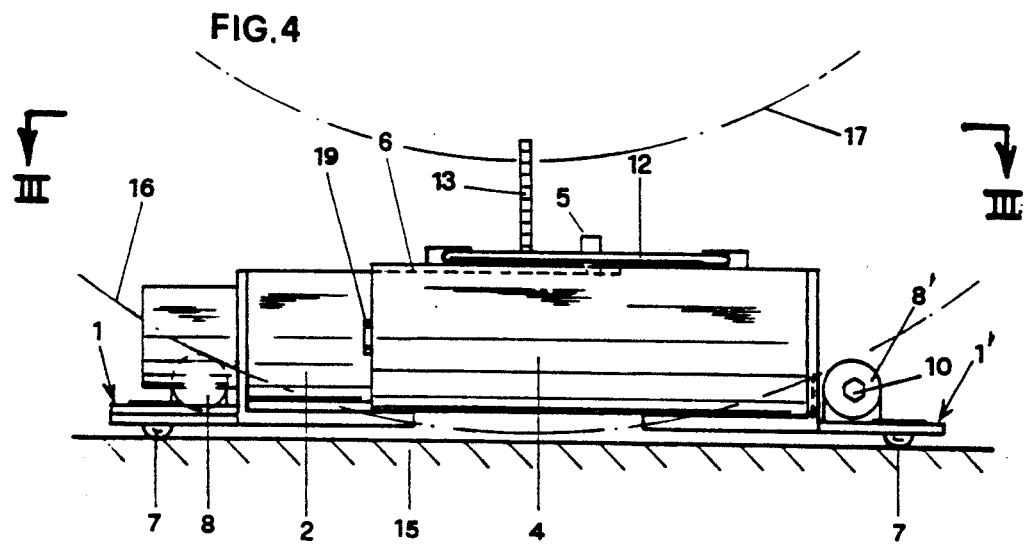
FIG. 4 is a front view thereof on the line IV—IV of FIG. 3.

As can be seen from the drawings, the device according to the invention comprises, in the embodiment shown in FIGS. 1-4, two L-shaped plates 1, 1', to one of which there is fixed along its horizontal side a cylinder-piston unit 2, preferably of single-acting pneumatic type, and to the other 1' there is fixed along its horizontal side the end of the rod 3 of said cylinder-piston unit 2 and a tubular member 4 which with the cylindrical casing of the cylinder-piston unit 2 forms a pair of mutually engaging telescopic elements. Relative rotation of the two elements is prevented by a small radial pin 5 rigid with the casing of the cylinder-piston unit 2 and engaging in a longitudinal slot 6 provided in the tubular member 4.

Each of the two L-shaped plates 1, 1' is provided lowerly with a pair of ball supports 7 and is also provided with a roller 8, 8' disposed with its axis parallel to the longitudinal side of the plate and supported by a pair of bearings 9, 9'.

Both the rollers 8, 8' are mounted idly on their own bearings 9, 9', one of said rollers, for example the roller 8', being provided with an axial cavity 10 of polygonal cross-section for the insertion of an operating handle 11.

A transporting and positioning handle 12 and a graduated vertical rod 13 are also fitted to the tubular member 4 by hinged supports. Finally the two plates 1, 1' are provided with two small cylinders 21, 21' of vertical axis which by way of their rod, which emerges from the underside of the corresponding plate and is provided with a rubber-covered foot, can adhere on command to the runway 15 and thus neutralize the effect of the ball supports 7.

For use, after the vehicle 14 has been driven up onto the lift runways 15 and has been halted on them without practically any constraint on its position, the conventional optical measuring instruments are applied to the wheels 16.

A device according to the invention, preferably already connected to the cylinder-piston unit 2 and to a central control unit, is then applied to each wheel 16. This central control unit is not shown on the drawings for simplicity; however it is preferable to provide on the vehicle lift a panel comprising connections for compressed air and electricity if the roller 8' is of motorized rather than manual operation, as will be apparent hereinafter.

Each device is positioned while keeping the cylinder-piston unit 2 in its maximum elongation position, so that the two rollers 8, 8' are spaced apart by a distance sufficient to enable them to be inserted between the wheel 16 and the runway 15 on opposite sides of the zone of contact between the wheels 16 and the runway 15. This insertion is facilitated by the presence of the handle 12.

After this operation has been repeated for both wheels, compressed air is fed into the cylinder-piston units 2. This causes each cylinder-piston unit 2 to contract and draw the two rollers 8, 8' of each pair together. After an initial free movement, the drawing together of the two rollers 8, 8' causes each wheel 16 to rise above the surface of the runway 15, to an extent which is measured by checking the position reached by the edge of the wheel rim 17 on the scale of the graduated rod 13. Having reached the predetermined value, which is equal for all four wheels, these will have been raised from the runways so that the vehicle is supported only via the ball supports 7, because of these, each wheel 16 can position itself freely on the runway 15 in relation to the forces received, to thus enable the various measurements to be taken by conventional methods and instruments.

As the determination of the suspension geometry requires the various measurements to be repeated after rotating each wheel through 180°, this rotation is effected simply by turning each roller 8' by the handle 11 after inserting it into the axial cavity 10 in the roller.

After repeating the measurements in the new wheel position, the overall measurements can be considered complete and the air can be released from the cylinder-piston units 2 to allow, initially, the weight of the vehicle itself and, finally, the presence of a helical spring 18 within each cylinder-piston unit 2 to cause the two rollers 8, 8' of each device to return to their mostly spaced-apart position to allow the devices to be removed.

As the line of action of the force which causes the two rollers 8, 8' of each device to approach each other coincides with the axis of the relative cylinder-piston unit 2, whereas the reaction due to the weight of the vehicle 14 extends along a straight line parallel to the preceding but passing through an intermediate point of the roller 8, 8' there is a tendency for the rollers to diverge with the risk of causing jamming in the relative movement between the cylinder-piston unit 2 and tubular member 4, but this can be prevented by fitting to both of these at their free end on the more highly stressed side a vertical axis small roller 19 for the purpose of facilitating relative sliding.

From the aforegoing it is apparent that the device according to the invention has numerous advantages, and in particular:

the vehicle no longer has to take an abligatory position on the runways, the measuring devices for the front and rear wheels are of identical construction, any vehicle lift can be used for effecting geometrical measurements on the suspensions, and in fact the device can be applied to any surface, including the floor and preferably in proximity to a pit, the measurements read off are independent of the tire inflation state and generally of the feasibility of arranging the vehicle perfectly coplanar with the runway surface.

there is no longer any constraint on the angular wheel movements in the horizontal plane, and each wheel can be rotated through 180° without losing supporting contact, thus making it possible to take measurements which are not influenced by the inevitable errors rising in raising the vehicle.

Figure 5:
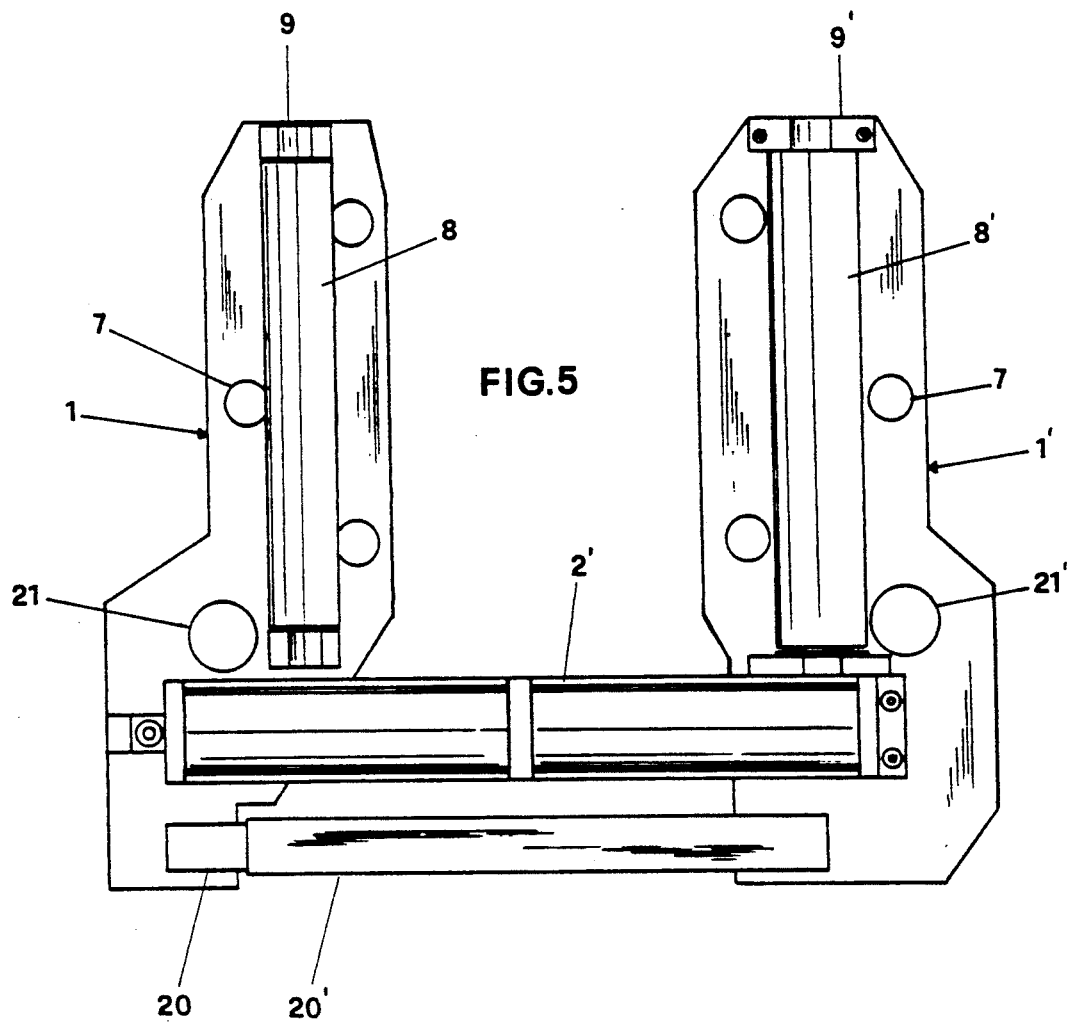
FIG. 5 is a modified embodiment thereof shown in the same view as FIG. 3.

In the embodiment shown in FIG. 5, the device of the invention is slightly different in that the mutual approach and withdrawal movements of the rollers 8 and 8' and the preservation of their parallelism during these movements are now determined by two different members. Specifically, the cylinder-piston unit 2 is used only for effecting said movements of the two rollers 8, 8' whereas they are kept parallel by the pair of telescopic elements 20 and 20' of square cross-section, which are fixed to the plates 1 and 1' parallel to the axis of the cylinder-piston unit 2.

In addition in the device of FIG. 5, the roller 8' is not driven manually but instead is provided internally with an electric motor (not visible on the drawing) which makes its rotation more comfortable and uniform.

Figure 7:
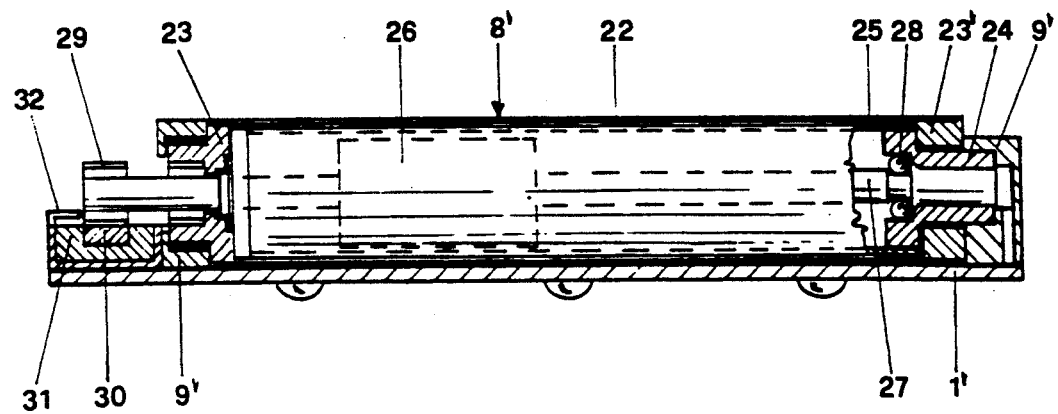
FIG. 7 is a vertical section view thereof on the line VII—VII of FIG. 6.
Figure 6:
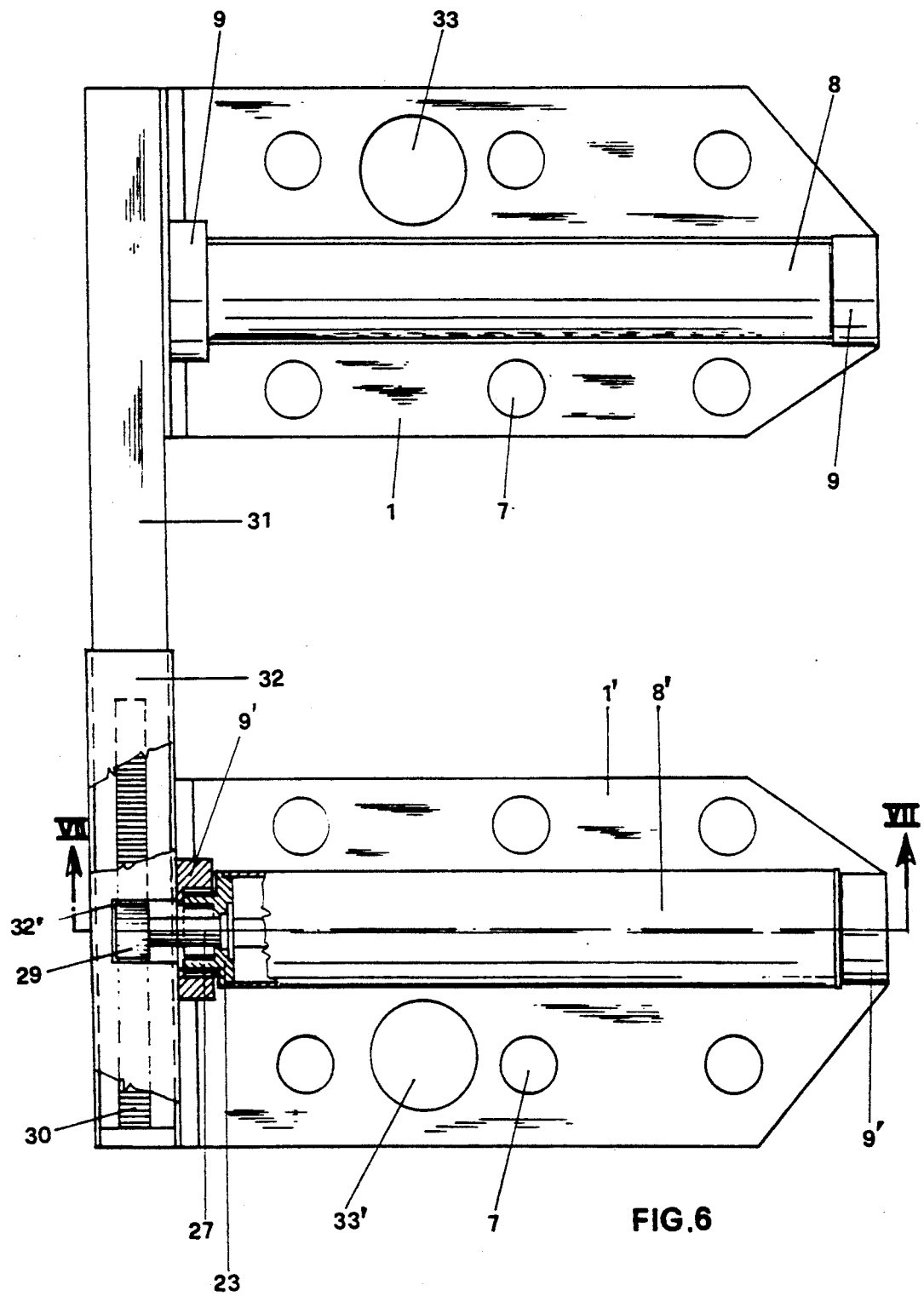
FIG. 6 is a plan view of a third embodiment thereof.

In the embodiment shown in FIGS. 6 and 7, the plate 1 supports the roller 8, which is idle on its own bearings 9, whereas the plate 1' supports the roller 8' which is of motorised kind. More precisely the roller 8' comprises an outer tubular element 22 closed at its ends by two axially hollow heads 23,23'. One of these, (on the left in FIG. 7) is directly supported by the corresponding left bearing 9' and is axially provided with an internally crown wheel. The other head 23' is axially crossed by a pin 24, supporting a cylindric body 25 housed inside the tubular element 22. This pin 24, after having crossed the head 23, is fixed to the right bearing 9', fixed in its turn to the plate 1'.

Inside the body 25 an electrical motor 26 is housed, the shaft 27 of which is supported at one end, through a bearing 28, by the head of the body 25 provided with the pin 24, and is provided at the opposite end with a gear wheel 29, rotationally bound to said shaft 27 but axially movable with respect to it between two end positions. In one of these positions, represented in dotted line in FIG. 7, the gear wheel engages with the inner crown wheel of the head 23, whereas in the other position, represented in continuous line in FIG. 7, engages with a rack 30 integral with the plate 1'.

More particularly a rectangular-section rod 31 is soldered to the plate 1 and the rack 30 is upperly applied to the rod 31. A rectangular-section tubular guide 32 is soldered to the plate 1', and is telescopically engageable with the rod 31 and provided in the upper surface with an opening 32', through which the gear wheel 29 can engage with the rack 30.

The device according to the invention operates as follow:

Each device is positioned while keeping the two rollers 8,8', as in the previous embodiment, are spaced apart by a distance sufficient to enable them to be inserted between the wheel 16 and the runway 15 on opposite sides of their contact zone.

When the device has been positioned, the electric motor 26 is fed after having coupled the gear wheel 29 with the rack 30. In this condition the rotation of the electric motor does not cause any effect on the tubular element 22 of the roller 8', whereas it causes the approach between said roller 8' and the roller 8 to an extent sufficient to raise the wheel 16 from the runway 15 and to support it by means of the two rollers 8,8'. During this phase the rollers 8,8' keep parallel each to other, due to the telescopic guide 31,32.

When the correct distance between the two rollers 8,8' has been reached, the necessary suspension geometry measurements can be carried out.

To cause the 180° rotation of the wheel, the axial displacement is caused of the gear wheel 29 which disengages from the rack 30 and engages in the crown wheel of the head 23. In this way the subsequent feeding of the electrical motor 26 causes the rotation of the external tubular element 22 of the roller 8' with respect to the inner body 25, which is fixed.

During this phase it is preferable that the device is locked with respect to the underlying runway 15 and for this reason two electromagnets 33, 33' are provided in each plate 1,1' respectively. Each electromagnet is provided with a little spring, which keeps it raised from the runway 15.

The invention foresees that near the axial position of the gear wheel 29, which determines its coupling to the crown wheel of the head 23, a microswitch controls the consent to the excitation of the electromagnets 33,33', so as to automatically ensure the locking of the device to the runway 15, in the configuration which causes the rotation of the wheel 16.

It is also possible to make easier the construction of the device if the mechanical rotation of the wheels is renounced. It is sufficient to have one roller 8 to be idle and the other roller 8' to be manually actuable, for example by a handle. In this case it has to be foreseen that the roller 8' is supported by its own bearings 9' through a free wheel device, which allows the rotation of the same roller during the raising phase of the vehicle onto it, but doesn't allow it during the descent phase.

I claim:

1. Device for supporting motor vehicle wheel when taking suspension geometry measurements comprising a structure (1,1') provided with ball shaped supports (7) for its free resting on an underlying horizontal surface (15), characterized by further comprising:
    a pair of rollers (8,8') with parallel axes, rotationally supported by said structure (1,1') and supporting a wheel (16) mounted on the vehicle (14),
    means (11,26) causing rotations of one of the two rollers,
    means (21,21',33,33') acting on said horizontal rest surface (15) to neutralize on command, the effect of said ball shaped supports (7) and to firmly bind said structure (1,1') to said surface (15) when the rotation of said one roller is caused,
the two rollers (8,8') of each pair being associated with members for being spaced apart to each other in a direction transverse to their axis between two end positions, in one of which the two rollers are on opposite sides of the zone of contact between said wheel and said resting surface (15), and in the other of which the two rollers are closer together to support said wheel (16) raised from said resting surface.

2. Device as claimed in claim 1 characterised by comprising a motor (26) for rotationally actuating one of the two rollers (8,8'), the other roller being idly supported on said structure (1,1').

3. A device as claimed in claim 1, characterised in that said structure comprises two separate plates (1,1'), each provided with ball supports (7) and supporting a roller (8,8'), the two plates (1,1') being mobile relative to each other on the resting surface (15), in a direction orthogonal to the axis of said rollers (8,8').

4. A device as claimed in claim 3, characterised in that each roller (8,8') is mounted on a plate (1, 1') provided with ball supports (7) and with means (2,2') for causing its transversal movement relative to the other plate (1, 1') in a direction orthogonal to the axis of said rollers (8, 8').

5. A device as claimed in claim 1, characterised in that one of said pair of rollers (8') comprises an axial cavity (10) engageable by a handle member (11) for its rotation with respect to said structure (1,1').

6. A device as claimed in claim 4, characterized in that the two support plates (1,1') for the two rollers (8,8') are substantially L-shaped, with one portion which is parallel to the axis of the respective roller (8,8') and is provided with supports (9,9') for this latter, and with the other portion which is provided with means (3) for its connection to the other plate (1,1').

7. A device as claimed in claim 4, characterised in that an actuator (2,2') is interposed between the two plates (1,1') to cause their relative movement.

8. A device as claimed in claim 6, further including an actuator (2) having a cylindrical casing, said cylindrical casing fixed to one plate (1) and the rod (3) of said actuator is fixed to the other plate (1'), between the two plates (1,1') means (4,5,6,20,20') being provided to prevent their relative rotation.

9. A device as claimed in claim 8, characterised in that the plate (1') secured to the rod (3) of the actuator (2) carries a tubular member (4), which is coaxially fixed to said rod (3) and forms a pair of telescopic elements with the casing of the actuator (2).

10. A device as claimed in claim 9, characterised in that said tubular member (4) comprises at least one slot (6) which extends along a generatrix thereof and is engaged by a radial pin (5) foreseen on the lateral cylindrical surface of said actuator (2).

11. A device as claimed in claim 10, characterised in that the edges of the two telescopic elements (2,4), which are most subjected to stress when the axes of the two rollers (8,8') tend to diverge, are provided with slide rollers (19) cooperating with the surface of the other element.

12. A device as claimed in claim 1, characterised in that it is provided with a handle (12).

13. A device as claimed in claim 1, characterised by comprising a member (13) for determining the correct position of the wheel (16) with respect to the resting surface (15).

14. A device as claimed in claim 13, characterised in that a graduated rod (13) is applied to the structure (1,1'), to determine the vertical position of a rim (17) of the corresponding wheel (16), with respect to the resting surface (15).

15. A device as claimed in claim 8, characterised in that a cylinder-piston unit (2) is interposed between the two plates (1,1') to cause their mutual approach, and also a pair of telescopic elements (20,20') of polygonal cross-section are interposed between said plates (1,1') to prevent divergence in the axes of the rollers (8,8') mounted on said plates.

16. A device as claimed in claim 1, characterised in that an element (21,21') is applied to each plate (1,1'), which element emerges lowerly to adhere to the underlying resting surface (15) and to bind said plate (1,1') to said resting surface (15).

17. A device as claimed in claim 16, characterised in that a pneumatic cylinder-piston unit (21,21') is applied to each plate (1,1'), having the rod emerging from the underside of said plate.

18. A device as claimed in claim 3 characterised in that a gear wheel (29) is applied to a plate (1'), having its axis parallel to the axis of the respective roller (8') and engaging in a rack (30) integral to the other plate (1).

19. A device as claimed in claim 2 characterised in that a gear wheel (29) is applied to a plate (1'), having its axis parallel to the axis of the respective roller (8') and engaging in a rack (30) integral to the other plate (1) and further including a shaft (27) keyed to said gear wheel (29) of said motor (26), which actuates one of said pair of rollers (8') and is engageable either to said rack (30) or to said one of said pair of rollers (8').

20. A device as claimed in claim 19 characterised in that the motor (26) is housed inside a cylindrical body (25) externally surrounded by one of said pair of rollers (8') and rotationally integral with the respective plate (1'), said gear wheel (29) being rotationally integral with the shaft (27) of said motor (26) and axially movable with respect to it between an engagement position with the rack (30) and an engagement position with a crown wheel provided on the inner surface of said roller (8').

21. A device as claimed in claim 3 characterised in that an electromagnet (33,33') is applied to each plate (1,1'), facing to the underlying resting surface (15), said electromagnet (33,33') being kept elastically spaced apart from said plane in unexcited condition, and adherent to said plane in excited condition, to block said plate to it.

22. A device as claimed in claim 20 characterised in that an electromagnet (33,33') is applied to each plate (1,1'), facing to the underlying resting surface (15), said electromagnet (33,33') being kept elastically spaced apart from said plane in unexcited condition, and adherent to said plane in excited condition, to block said plate to it, and further comprising a microswitch acting on said excitation circuit of the electromagnets (33,33') when the gear wheel (29) is engaged with the roller (8'), to automatically keep the plate (1,1') blocked with respect to the underlying resting surface (15) during the rotation of said roller (8').

23. A device as claimed in claim 2 characterised in that one of said pair of rollers (8') provided with means (26,11) for its rotation has a knurled lateral surface.

* * * * *